United States Patent
Prasad et al.

(10) Patent No.: US 9,652,328 B2
(45) Date of Patent: May 16, 2017

(54) RESTORING AN APPLICATION FROM A SYSTEM DUMP FILE

(71) Applicant: International Business Machines Corporation, Armonk, NY (US)

(72) Inventors: Aravinda Prasad, Mysore (IN); Mahesh J. Salgaonkar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 370 days.

(21) Appl. No.: 14/274,829

(22) Filed: May 12, 2014

(65) Prior Publication Data
US 2015/0324254 A1    Nov. 12, 2015

(51) Int. Cl.
| G06F 11/00 | (2006.01) |
| G06F 11/14 | (2006.01) |
| G06F 17/30 | (2006.01) |
| G06F 11/07 | (2006.01) |

(52) U.S. Cl.
CPC ...... *G06F 11/1438* (2013.01); *G06F 11/0778* (2013.01); *G06F 11/1402* (2013.01); *G06F 11/1469* (2013.01); *G06F 17/30864* (2013.01); *G06F 2201/80* (2013.01)

(58) Field of Classification Search
CPC .. G06F 11/1402; G06F 11/1438; G06F 11/14; G06F 11/1469; G06F 11/0778; G06F 11/07; G06F 17/30864; G06F 17/30; G06F 2201/80

USPC .......................................................... 714/15
See application file for complete search history.

(56) References Cited

U.S. PATENT DOCUMENTS

| 7,774,636 | B2 | 8/2010 | Rao et al. |
| 2008/0228833 | A1* | 9/2008 | Kano ................. G06F 11/1469 |
| 2010/0083048 | A1* | 4/2010 | Calinoiu ............ G06F 11/0778 714/38.11 |
| 2013/0346797 | A1 | 12/2013 | Lang et al. |
| 2014/0006465 | A1* | 1/2014 | Davis ................ G06F 17/30194 707/827 |
| 2015/0324256 | A1* | 11/2015 | Prasad .................... G06F 11/14 714/19 |
| 2016/0364317 | A1* | 12/2016 | Rehman ............. G06F 11/3664 |

OTHER PUBLICATIONS

Wikipedia "core dump" page, from Apr. 4, 2014, retrieved using the WayBackMachine, from https://web.archive.org/web/20140404163221/http://en.wikipedia.org/wiki/Core_dump.*
IBM, "FDR (Fast Dump Restore)", Date last modified Oct. 10, 2013, <http://www-304.ibm.com/partnerworld/gsd/solutiondetails.do?solution=945&expand=true&lc=en>.

* cited by examiner

*Primary Examiner* — Yair Leibovich
(74) *Attorney, Agent, or Firm* — Alexander G. Jochym

(57) ABSTRACT

An application is identified that was running at a time of a system crash. A system dump file is received that was created responsive to the system crash. A restoration dataset stored in the system dump file is determined. The application is restored based, at least in part, on the restoration dataset.

10 Claims, 3 Drawing Sheets

RESTORING AN APPLICATION FROM A SYSTEM DUMP FILE

FIELD OF THE INVENTION

The present invention relates generally to the field of application and system recovery, and more particularly to restoring an application after a system crash.

BACKGROUND OF THE INVENTION

Due to the nature and growing complexity of software, there are increasing opportunities for a possibility of an error or fault in the software. Such errors or faults are, generally, handled by exception handles, but not all errors or faults can be handled by exception handles and these can lead to system crashes. Most of the time, upon system crash, a dump file is generated to allow for debugging to look for a solution to the problem. This dump file, often called a kernel dump file, contains the entire memory image of the program, including the central processing unit (CPU) state.

If an error happens in the kernel of the computer system, the entire system crashes and all applications running on the computer system crash as well. Most of these crashes occur due to bugs in the kernel. If such crashes occur, the kernel dump file is saved, the computer system is rebooted, and an application can be restarted. Restarting an application from the beginning can lead to loss of data and computation time. Current backup techniques employ checkpoint-restore for fault tolerance.

In a checkpoint-restore technique, the application is check-pointed at regular intervals of time. If the kernel crashes, the computer system is rebooted and an application can be restored from the last check-point. The checkpoint-restore technique has a few drawbacks. First, the computations performed by the application from the last checkpoint until the time of the system crash are lost. Second, check-pointing itself may take a long time if the application has a large memory buffer. Third, check-pointing may freeze the application while generating a consistent snapshot of the application, and this is performed at regular intervals, affecting application performance.

SUMMARY

Embodiments of the present invention include a method, computer program product, and system for restoring an application from a system dump file. In one embodiment, an application is identified that was running at a time of a system crash. A system dump file is received that was created responsive to the system crash. A restoration dataset stored in the system dump file is determined. The application is restored based, at least in part, on the restoration dataset.

DETAILED DESCRIPTION

Figure 1:
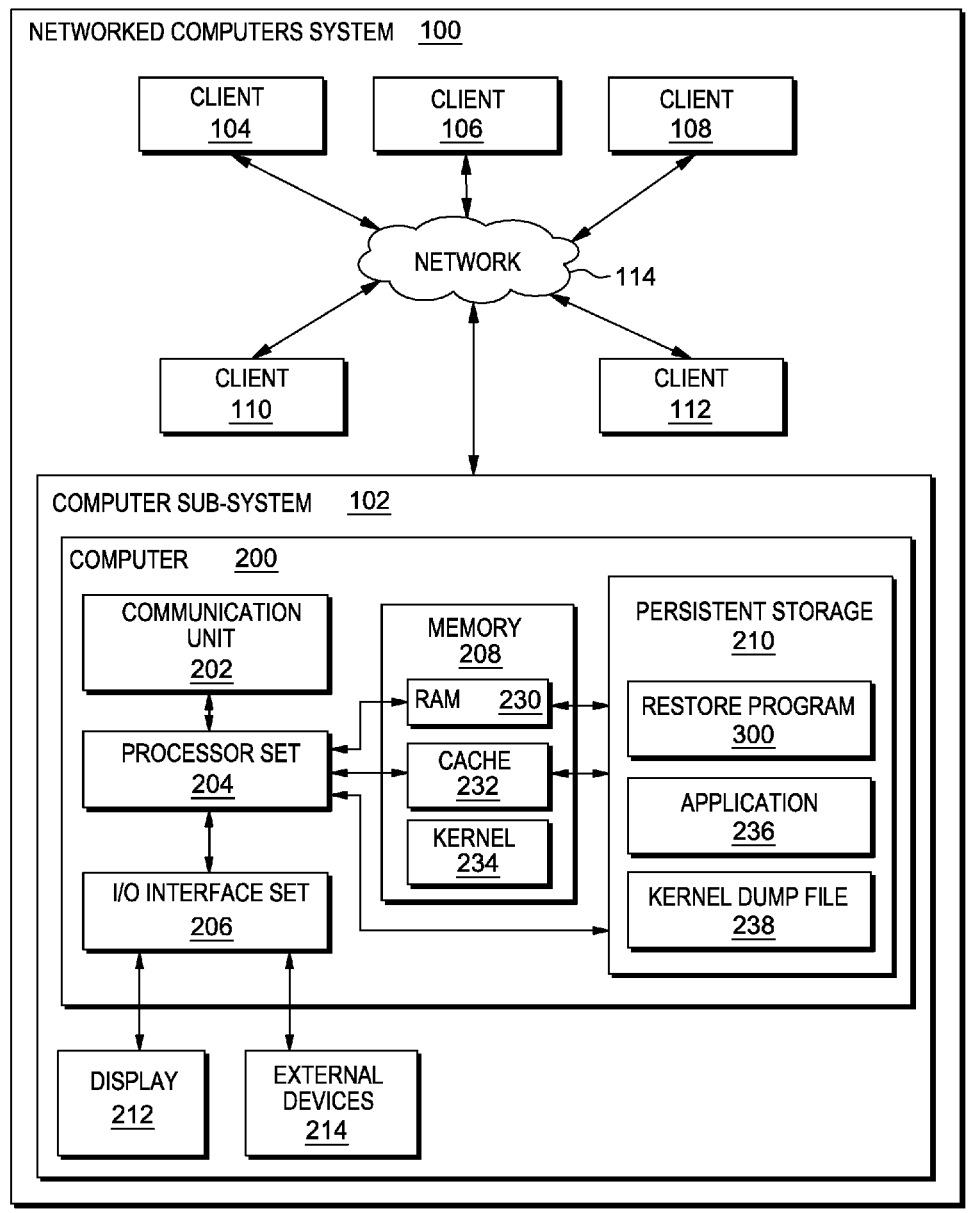
FIG. 1 is a schematic view of a first embodiment of a system according to the present invention.

As software complexity increases, system crashes seem to occur more frequently. As stated previously, the conventional checkpoint-restore technique that backs up a computer system has a number of drawbacks. Some embodiments of the present invention provide a restore program that solves the aforementioned problem by restoring the crashed application from the kernel dump file. In other words, the application is restored to the state it was in at the time of system crash. This avoids the need to deploy the checkpoint-restore technique and the drawbacks that come along with that technique.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: computer sub-system 102; clients 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; kernel 234; restore program 300; application 236; and kernel dump file 238.

Computer sub-system 102 is, in many respects, representative of the various computer sub-system(s) in the present invention including client 104, 106, 108, 110 and 112. Accordingly, several portions of sub-system 102 will now be discussed in the following paragraphs.

Sub-system 102 may be a laptop computer, tablet computer, netbook computer, personal computer (PC), enterprise servers, a desktop computer, a personal digital assistant (PDA), a smart phone, or any programmable electronic device capable of communicating with the client sub-systems via network 114. Restore program 300 is a collection of machine readable instructions and/or data that is used to create, manage and control certain software functions that will be discussed in detail, below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Restore program 300, application 236 and kernel dump file 238 are stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Restore program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, restore program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Resident on computer 200, kernel 234 is a computer program that manages input/output requests from software and translates these requests into data processing instructions for the central processing unit and other electronic components of a computer, such as memory and devices. Kernel 234 is the core of a modern computer's operating system and common uses include the Linux kernel, used on many Linux-based operating systems; Windows 9x kernel, used in Windows 95, 98 and ME; Windows NT kernel, used in all Windows NT systems including Windows 2000, XP, Vista, and 7; and XNU, used in Mac OS X operating systems. (Note: the term(s) "Linux," "Windows," "Vista," "XNU," and/or "Mac OS" may be subject to trademark rights in various jurisdictions throughout the world and are used here only in reference to the products or services properly denominated by the marks to the extent that such trademark rights may exist.) Kernel 234, described herein, can be any one of the above referenced kernels, any other kernel found in any operating system, or any other function or program that performs tasks similar to the kernel as known in the art.

Upon boot of the operating system on computer sub-system 102, kernel 234 is stored (not shown) in persistent storage 210 but then deployed in memory 208, as shown in FIG. 1. Upon deployment, kernel 234 controls the operations discussed in the above paragraph. Throughout the course of the computer sub-system performing the actions of applications or functions, these applications or programs make requests of the kernel, via a system call. As the kernel performs its primary function of managing the computer's hardware and resources, and enabling other programs to run, access, and use these resources, errors may occur. If an error is a fatal error, an error from which the operating system or kernel cannot safely recover from, computer sub-system 102 may crash and reboot.

Upon a system crash and before a reboot process occurs, kernel dump file 238 will be created in persistent storage 210. Kernel dump file 238 may also be known as a system dump file, a crash dump file, a system crash dump file, or any other term known in the art suitable for the foregoing intended use. A kernel dump file often consists of the recorded state of the working memory of a computer program at a specific time, usually when the program has terminated abnormally. In practice, other key pieces of program state are usually dumped at the same time. This can include at least one of the following: (i) the contents of processor registers, (ii) a program counter, (iii) a stack pointer, (iv) memory management information, (v) heap, (vi) state of architected registers, (vii) state of processor(s), (viii) operating system flags, and (ix) information that existed near a time of a fault. Generally, a kernel dump file is used to assist in diagnosing and debugging computer programs or the kernel.

The method of creating a kernel dump file is well known in the art and will be discussed in brief, but it should be known that a kernel dump file can be created and written to persistent storage 210 in any other way suitable for the foregoing intended use. One method involves the first, crashed, kernel. Kernel 234 may create and write the kernel dump file 238 to persistent storage 210. Alternatively, it is preferable to use an entity outside of the first kernel to create and write the kernel dump file 238. Here, software tools are used to create a kernel-to-kernel bootloader, and the kernel that crashed can load and run a second instance of a kernel. The second kernel may now create and write kernel dump file 238 to persistent storage 210. In another alternative, with the growing use of virtualization, a hypervisor may create and write kernel dump file 238 to persistent storage 210.

Restore program 300 operates to restore an application 236 to the state it was in at the time of a system crash that causes computer 200 to reboot. When an error occurs in a kernel the entire system crashes and all applications running on the kernel's computer are abruptly terminated. However, often the cause of the system crash is due to a bug in kernel 234, and not directly related to a failure in application 236. As discussed previously, upon system crash, kernel dump file 238 is generated for debugging to determine the source of the problem. Kernel dump file 238 is stored in persistent storage 210. Restore program 300 extracts information from kernel dump file 238 and uses this information to restore application 236 to the state it was in at the time of kernel crash.

Figure 2:
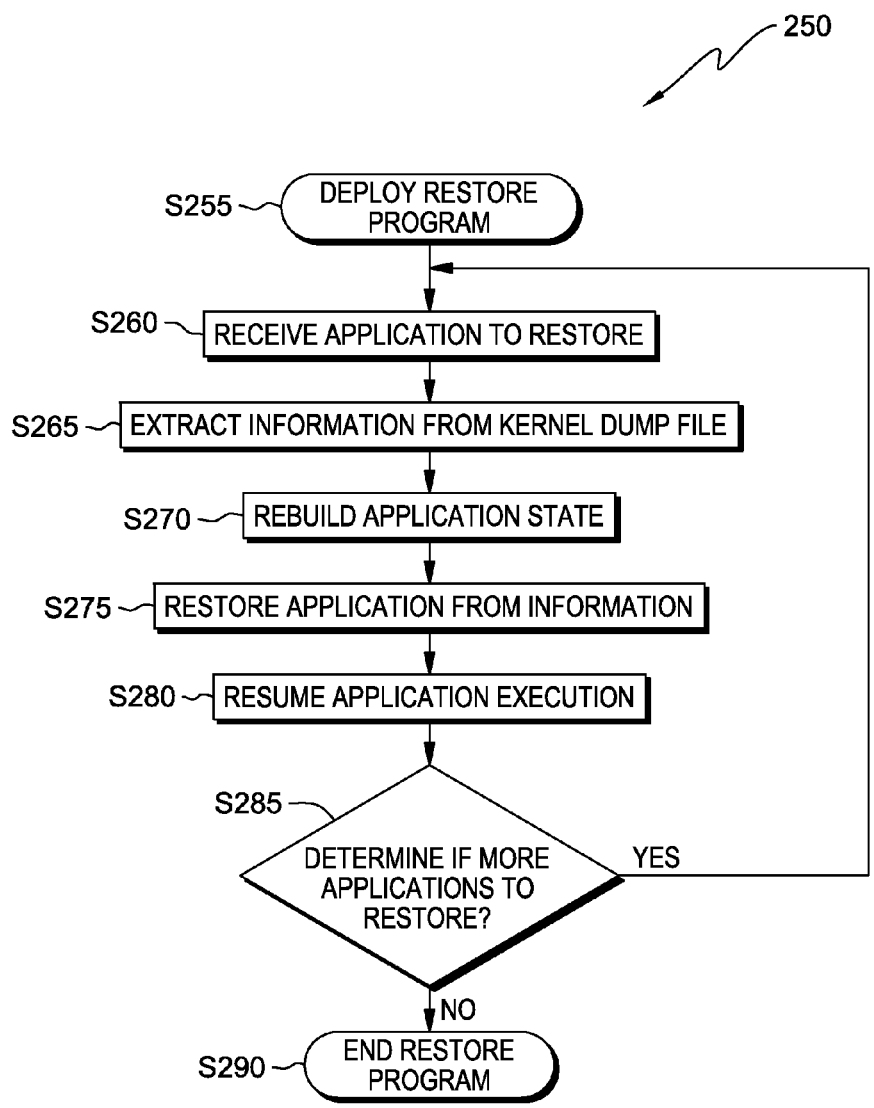
FIG. 2 is a flowchart showing a method performed, at least in part, by the first embodiment system.
Figure 3:
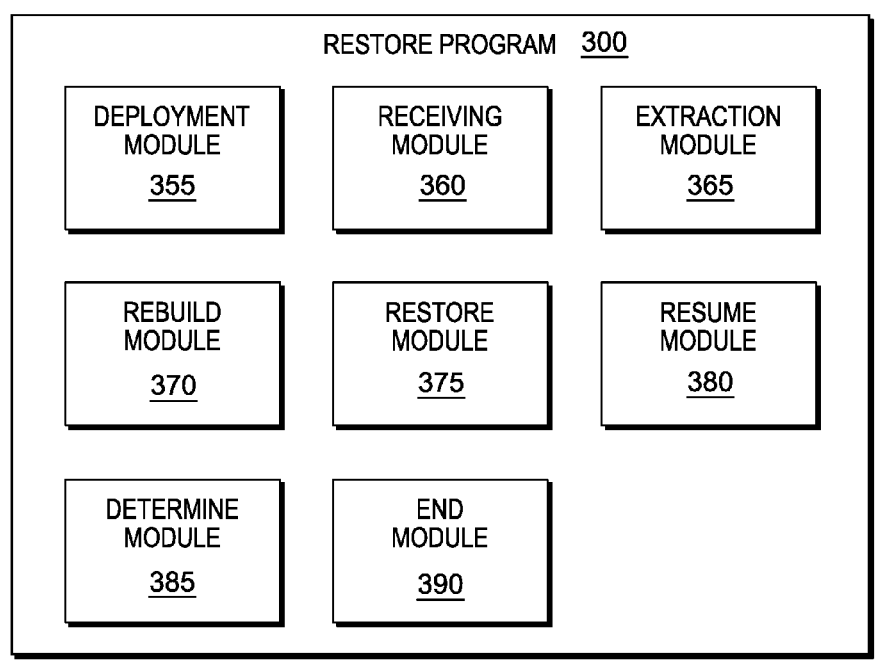
FIG. 3 is a schematic view of a machine logic (for example, software) portion of the first embodiment system.

FIG. 2 shows flowchart 250 depicting a first method according to the present invention. FIG. 3 shows restore program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where deployment module 355 deploys restore program 300. Deployment module 355 detects an input from a user indicating that the user would like to execute restore program 300. Alternatively, this step may occur by an automated process after a system reboot. In one embodiment, this step may occur directly after a system boot due to a system crash. Alternatively, this step may occur at any time after a system boot due to a system crash or after any event that results in the creation of kernel dump file 238.

Processing proceeds to step S260, where receiving module 360 receives an indication of an application 236 to restore. In this embodiment, step S260 is performed from a user input. Alternatively, this step is performed from an automated input from another application or function (not shown). Receiving module 360 receives an indication of an application 236 to restore. Application 236 may or may not be currently running. Application 236 may be chosen from a list of applications that were running at the time of system crash, as determined by module 360. Alternatively, application 236 may be chosen and module 360 must determine if application 236 was running at the time of system crash. For example, a user is operating on computer 200 that just had a fatal error, there was a system crash, kernel dump file 238 was created, and computer 200 was rebooted. After computer 200 proceeds through the standard boot and startup process, as known in the art, and user has executed restore program 300, computer 200, using display 212, displays a drop down menu of application(s) 236 that were running at the time of system crash. For example, a user may be prompted to select from Applications A, B, and C. Alternatively, there may have been any number of applications running at the time of system crash and they would all be displayed to the user. The user then chooses Application A to restore by clicking on Application A on the drop down menu and then choosing a submit option to proceed to the next step.

Processing proceeds to step S265, where extraction module 365 extracts information from kernel dump file 238. Restore program 300, after determining application 236 to restore, determines the information from kernel dump file 238 that will be needed to restore application 236. Restore program 300 then extracts, or removes, that information from kernel dump file 238. The information that is extracted from kernel dump file 238 may include: (i) stack; (ii) heap; (iii) cpu state; (iv) state of the architected registers; (v) application state; (vi) resources assigned or used including shared memory, shared libraries, open file descriptors and sockets; and/or (vii) thread specific information, all of which being relevant to application to 236. Additionally, if application 236 was processing larger amounts of data at the time of system crash, the actual data generated by application 236 could have been paged out to swap space. Is such a case, extraction module 365 may determine, from at least one of the stack, heap, cpu state, and state of the architected registers, if swap space has been utilized and, responsive to determining that swap space has been utilized, extraction module extracts relevant information from swap space, provided the computer sub-system 102 has a mechanism to retain data in swap space upon system crash and reboot. For example, extraction module 365 extracts information from kernel dump file 238 for restoring application 236. Additionally, extraction module 365 determines if application 236 was using swap space, and if so, the extraction module extracts relevant information from the swap space. Heap referred to herein is the dynamically allocated memory region of the application address space.

In computer science, a stack is a collection of entities, with the principal operations on the collection being the addition of an entity to the collection, a "push", and removal of an entity, a "pop." A stack has a bounded capacity. If the stack is full and does not contain enough space to accept an entity to be pushed, the stack is then in an overflow state. The stack is a restricted data structure that is not directly accessible by a program. Only a few operations are performed on it. The nature of the pop and push operations also mean that stack elements have a natural order. Elements are removed from the stack in the reverse order to the order of their addition. Therefore, the lower elements are those that have been on the stack the longest.

In computer science, the architectural state consists in part of a state of the central processing unit (CPU) which holds part of the state of a process, and this includes control registers and general purpose registers. The control registers can include at least one of the following: instruction flag registers, interrupt mask registers, memory management unit registers or status registers. General purpose registers can include at least one of the following: general purpose registers, address registers, floating point registers, counter registers, index registers, stack registers, and string registers.

Processing proceeds to step S270, where rebuild module 370 rebuilds the application state. The rebuild module determines the state of application 236 at the time of the system crash. In this embodiment, rebuild module 370 determines what hardware application 236 was interacting with at the time of system crash. Additionally, rebuild module 370 may determine any other software that application 236 was interacting with at the time of crash. For example, application 236 may have been interacting with a camera system (not shown) along with interacting with the corresponding software that is used with the camera system. Rebuild module 370 restores any connections at the time of the system crash and restores application 236 to the state that it was at the time of system crash.

Processing proceeds to step S275, where restore module 375 restores application 236 from the information extracted from kernel dump file 238. In other words, the restore module, using the information extracted from the kernel dump file, puts application 236 in the state it was in when the system crashed. Here, application 236 is restored as if it had already processed the data that had been processed prior to the system crash. Further, application 236 is restored such that it is ready to handle and process the next data in the data set that application 236 was handling at the time of the system crash. For example, application 236 was processing a data set that included information for each day of a month. Application 236 had processed information up to and including the fifteenth of the month when the system crashed. Restore module 375 restores application 236 so that it has processed information from the first to the fifteenth, and also sets up restore application 236 so that the next piece of information application 236 will process will be information associated with the sixteenth of the month.

Processing proceeds to step S280, where resume module 380 resumes application 236 execution. In other words, application 236 begins to run as it did immediately before system crash, having completed a certain data set or process and starting to work on the next available data set or process. For example, application 236 begins to function as it was just before system crash. Application 236 has processed all information the same that it had before system crash and can now take that information and continue to move through that information, processing the data set or completing the tasks that are next in line for application 236. Alternatively, application 236 begins to run as it did at any time before system crash.

Processing proceeds to step S285, where determine module 385 determines if there are any other application(s) to restore. In this embodiment, restore program 300 determines if there are any additional application(s) to restore once application 236 is restored. Alternatively, restore program 300 receives a list of applications to restore in step S260, so when application 236 is restored, the restore program initiates the restoration process for a next application (not shown). Alternatively, only application 236 is restored and processing proceeds to step S290. For example, application 236 is now running independently of restore program 300 and may be continuing to process data. If restore program 300 determines there is another application (not shown) to restore (decision block S285, yes branch), then restore program 300 proceeds to S260 where a new application (not shown) is indicated for restoration. Alternatively, if restore program 300 determines there are no other applications to restore (decision block S285, no branch), the restore program 300 proceeds to end restore program (S290).

Processing ends at step S290, where end module 390 ends restore program 300. In other words, the restore program has finished restoring all applications, for example, as specified by a user, and can now end execution. For example, application 236 and any other applications that needed to be restored have been restored, and restore program 300 ends. All work has been completed by restore program 300.

In an alternative embodiment, the above discussed method can be applied to recover guest instances of virtual machines on a host computer system in the event of a hypervisor crash. All instances of the guest virtual machines can be restored from the hypervisor dump, without using the check-pointing method. Here, the hypervisor dump is similar to the previously discussed kernel dump file 238. This mechanism enhances the fault tolerance mechanism in the cloud environment, and is much less resource exhaustive as compared to check-pointing each and every guest instance of virtual machines running in the cloud to restore the guest instance in the case of hypervisor crash.

An exemplary embodiment of the present invention is provided for a Linux operating system. Those persons skilled in the art will recognize that the illustrated embodiment can be extended to any operating system. In this embodiment, the task_struct associated with the application is fetched from kernel dump file 238. The task→mm-→mmap provides all virtual memory areas (VMA) associated with the task. An elf_phdr structure is built for VMA of the task, which includes information such as type, size, permission, and page alignment. The associated page for the VMA is extracted from the kernel dump file by converting the corresponding virtual address to a physical address, and then converting the physical address to file offset in the dump file.

Further, information such as stack, instruction pointer, saved context, and information related to multiple threads is fetched from task_struct. Once all of this information is extracted from kernel dump file 238, application 236 is ready to be restored to the state it was in at the time of the system crash. The process of restoring application 236 requires help from kernel 234 and, therefore, requires suitable changes by kernel 234. The restoring procedure forks a process and creates threads for each thread in application 236 to be restored. The address space is re-mapped in these threads and the stack, instruction pointer, and all other thread or process specific data extracted from kernel dump file 238, is restored with the help of kernel 234. Some of the application programming interfaces used to restore thread stack and to remap address space is already available with the Linux kernel as a part of check-point restore technique. Once all the required data for application 236 is restored inside a newly created process with the help of kernel 234, the process is ready to run. The process is put in the run queue and starts executing when scheduled. In that way, application 236 runs, after restoration, according to any next operations that would have occurred if there were no system crash. This is possible because the stack, address mappings, cpu state, and/or instruction pointer are in the same state as when the system crashed.

In the above example, a possible implementation technique is provided without low level implementation details. However, implementation also requires taking care of additional details, such as: (i) handling the case when the application is in the middle of a system call and (ii) handling the open file descriptors.

Some embodiments of the present invention may include one, or more, of the following features, characteristics, and/or advantages: (i) the ability to restore an application in the case of system crash without the need for check-pointing; (ii) the application is restored to the state it was in at the time of system crash; (iii) there is no need to perform regular check-pointing and therefore the system saves resources (cpu cycles to perform checkpoint operations and disk space to store the checkpoint image); and/or (iv) applications are not interrupted or frozen at regular intervals to take the snapshot during the checkpoint-restore method.

What is claimed is:

1. A computer program product for restoring an application from a kernel dump file, the computer program product comprising:

one or more computer-readable storage media and program instructions stored on the one or more computer-readable storage media, the program instructions comprising:

program instructions to identify an application that was running at a time of a system crash;

program instructions to receive a kernel dump file that was created responsive to the system crash;

program instructions to determine a restoration dataset stored in the kernel dump file;

program instructions to determine, based on the restoration dataset, if data generated by the application at the time of the system crash was paged out to swap space;

program instructions, responsive to determining data generated by the application at the time of the system crash was paged out to swap space, to extract swap space information; and program instruction to restore the application based, at least in part, on the restoration dataset and the swap space information, wherein the application is restored to the state it was in at the time of the system crash.

2. The computer program product of claim 1, wherein the restoration dataset includes at least one of the following: stack, heap, central processing unit state, resources assigned or used including shared memory, shared libraries, open file descriptors and sockets, and thread specific information.

3. The computer program product of claim 1, further comprising program instructions, stored on the one or more computer readable storage media, to:
 determine a plurality of target applications to restore that were running prior to the system crash.

4. The computer program product of claim 1, further comprising program instructions, stored on the one or more computer readable storage media, to:
 select the target application from a list of applications that were running at the time of the system crash.

5. The computer program product of claim 1, wherein the application is restored to the state it was in at a time before the system crash.

6. A computer system for restoring an application from a kernel dump file, the computer system comprising:
 one or more computer processors;
 one or more computer readable storage media; and
 program instructions, stored on the one or more computer readable storage media, for execution by at least one of the one or more computer processors, the program instructions comprising:
  program instructions to identify an application that was running at a time of a system crash;
  program instructions to receive a kernel dump file that was created responsive to the system crash;
  program instructions to determine a restoration dataset stored in the kernel dump file;
  program instructions to determine, based on the restoration dataset, if data generated by the application at the time of the system crash was paged out to swap space;
  program instructions, responsive to determining data generated by the application at the time of the system crash was paged out to swap space, to extract swap space information; and
  program instruction to restore the application based, at least in part, on the restoration dataset and the swap space information, wherein the application is restored to the state it was in at the time of the system crash.

7. The computer system of claim 6, wherein the restoration dataset includes at least one of the following: stack, heap, central processing unit state, resources assigned or used including shared memory, shared libraries, open file descriptors and sockets, and thread specific information.

8. The computer system of claim 6, further comprising program instructions, stored on the one or more computer readable storage media for execution by at least one of the one or more computer processors, to:
 determine a plurality of target applications to restore that were running prior to the system crash.

9. The computer system of claim 6, further comprising program instructions, stored on the one or more computer readable storage media for execution by at least one of the one or more computer processors, to:
 select the target application from a list of applications that were running at the time of the system crash.

10. The computer system of claim 6, wherein the application is restored to the state it was in at a time before the system crash.

* * * * *